United States Patent
Röseler et al.

[11] Patent Number: 5,917,984
[45] Date of Patent: Jun. 29, 1999

[54] MANAGEMENT-CAPABLE SPLICE CASSETTE

[75] Inventors: Volker Röseler; Clemens Rogge; Klaus Klein, all of Berlin, Germany

[73] Assignee: Krone Aktiengesellschaft, Berlin-Zehlendorf, Germany

[21] Appl. No.: 08/814,630

[22] Filed: Mar. 10, 1997

[30] Foreign Application Priority Data

Mar. 14, 1996 [DE] Germany .......................... 196 11 770

[51] Int. Cl.$^6$ ...................................................... G02B 6/00
[52] U.S. Cl. ............................................................ 385/135
[58] Field of Search ..................................... 385/135–137

[56] References Cited

U.S. PATENT DOCUMENTS

| | | | |
|---|---|---|---|
| 4,500,166 | 2/1985 | Kunze | 385/135 |
| 5,071,220 | 12/1991 | Ruello et al. | 385/135 |
| 5,100,221 | 3/1992 | Carney et al. | 385/135 |
| 5,249,252 | 9/1993 | Noto | 385/135 |
| 5,323,478 | 6/1994 | Milanowski et al. | 385/135 |
| 5,323,480 | 6/1994 | Mullaney et al. | 385/135 |
| 5,363,466 | 11/1994 | Milanowski et al. | 385/135 |
| 5,619,608 | 4/1997 | Foss et al. | 385/135 |
| 5,668,911 | 9/1997 | Debortoli | 385/135 |
| 5,751,882 | 5/1998 | Daems et al. | 385/135 |

FOREIGN PATENT DOCUMENTS 0 215 668 A2  3/1987  European Pat. Off. .
WO 94/24599  10/1994  WIPO .

*Primary Examiner*—Hemang Sanghavi
*Attorney, Agent, or Firm*—McGlew & Tuttle, P.C.

[57] ABSTRACT

The invention relates to a management-capable splice cassette for the telecommunication and data technique, for receiving carrier shells for two glass fibers each. A housing is provided with a cable connection device and a carrier is connected to said housing. The carrier shells are connected to the carrier in a rotatable manner. The management-capable splice cassette is exchangeable with other splice cassettes and can in particular be inserted in prior art splice cassette housings instead of the conventional splice cassettes. The invention provides an available reserve length and a small constructional height as well as an economical and simple handling. The carrier shells are disposed in at least two adjacent receiving portions and stacked upon each other, each of carrier shells is rotatably supported into a latch position at one of their sides.

20 Claims, 5 Drawing Sheets

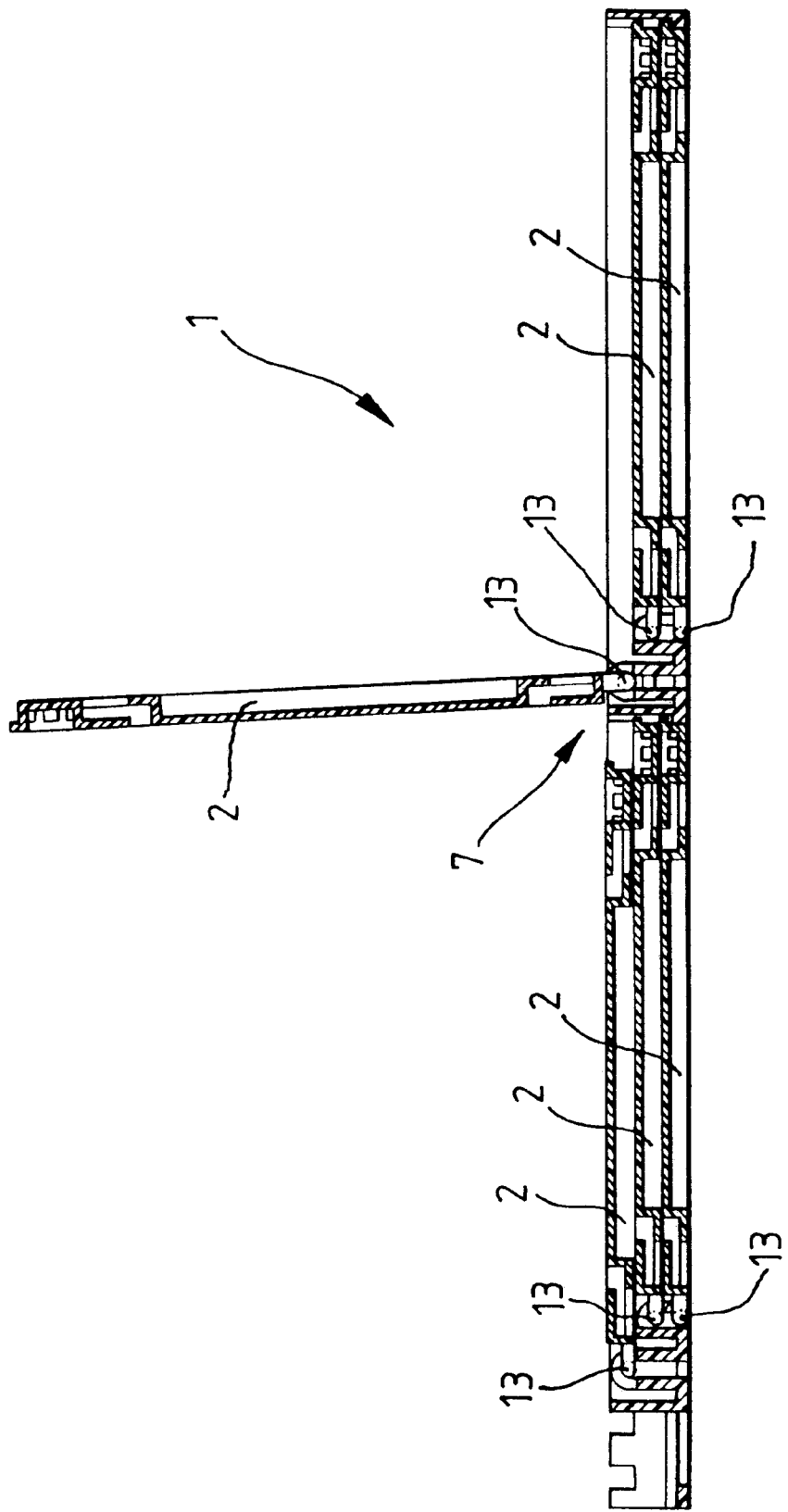

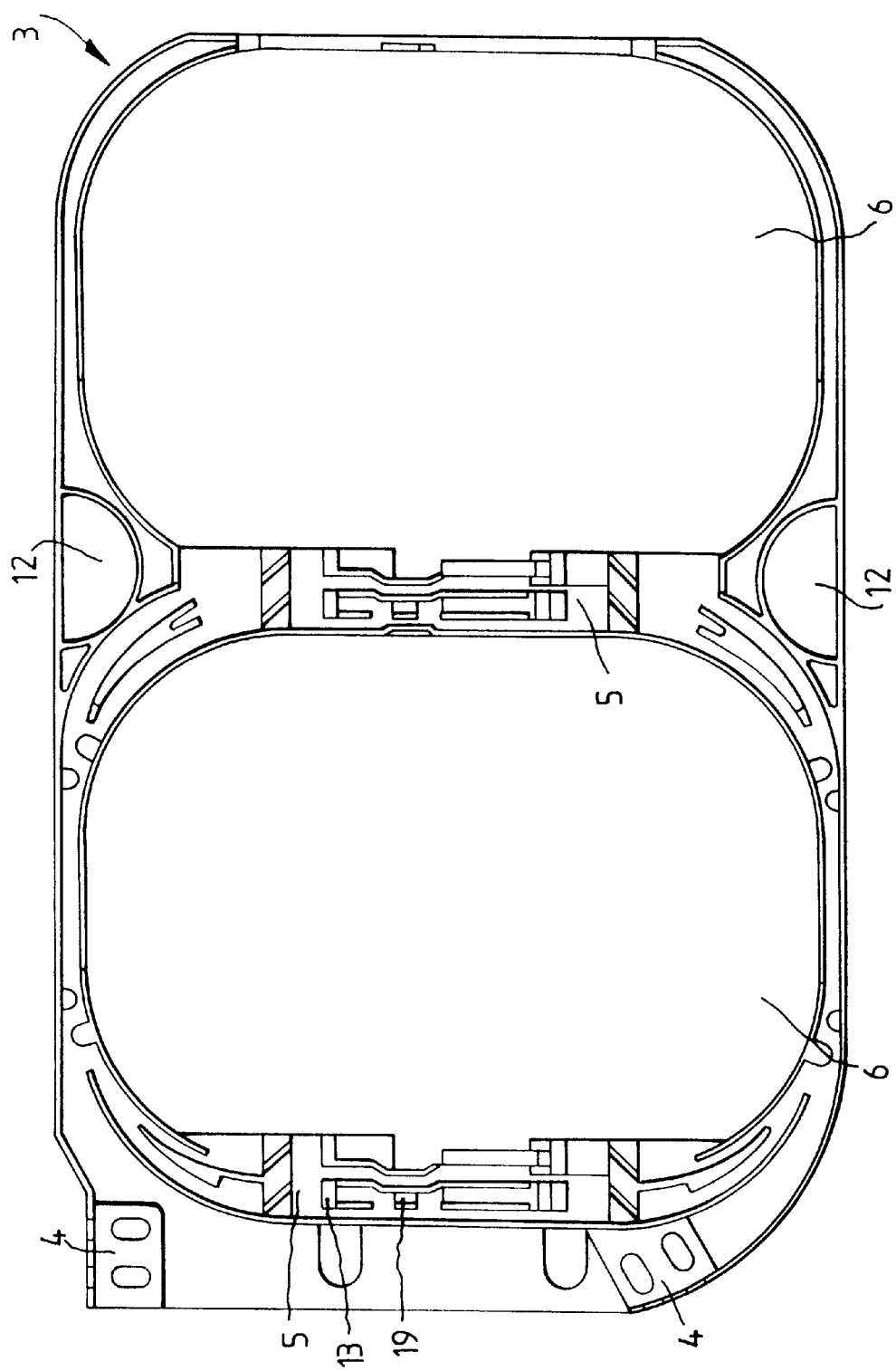

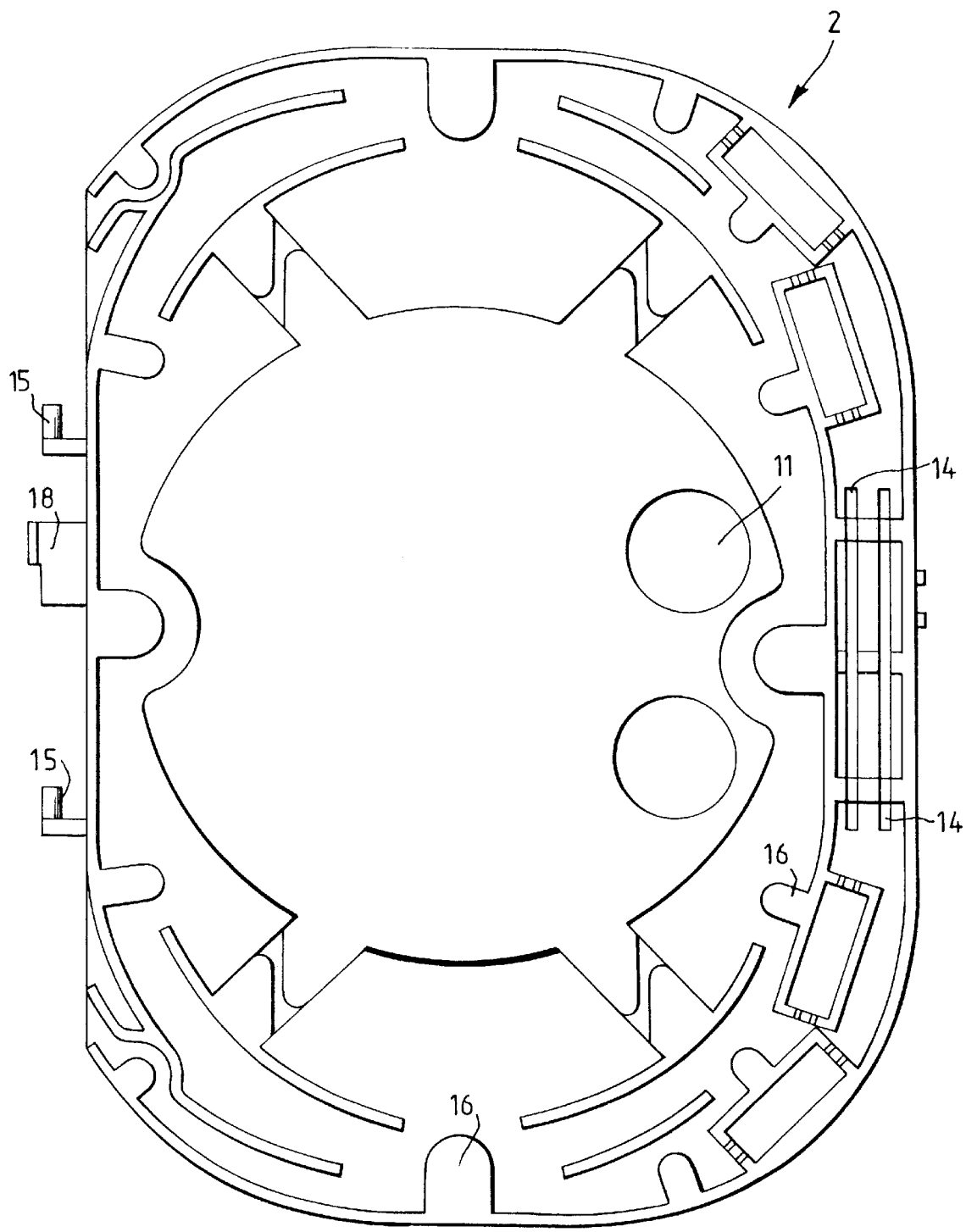

MANAGEMENT-CAPABLE SPLICE CASSETTE

FIELD OF THE INVENTION

The invention relates to a management-capable splice cassette for telecommunication and data communications applications, for receiving carrier shells for two glass fibers each including a housing with cable connection means, a carrier connected to the housing and carrier shells connected to the carrier in a rotatable manner.

BACKGROUND OF THE INVENTION

In addition to conventional splice cassettes for up to twenty-four splices accommodated in splice cassette housings and providing a sufficient working length of switching and bundle wires, splice receiving portions for a maximum of two splices have become known in the art as the so-called "single-circuit management".

These splice receiving portions designated "singlecircuit management" are carrier shells for two glass fibers movably combined by a carrier to a unit. The application of such carriers is advantageous when high safety requirements are to be met by the connection to be switched. A rigid and controlled guiding of the fibers is secured.

From U.S. Pat. No. 5,323,480 it is known in the art to provide a splice cassette comprising a housing with cable connection means for one or more glass fibers and a carrier, and a multitude of carrier shells. The carrier shells are rotatably connected at one end to the carrier. Each carrier shell can be moved between a stacked and a lifted position, in order to facilitate access to the carrier shells arranged underneath.

For guiding the fibers, flexible transportation sleeves are used that are employed from the cable connection means to the carrier shells. In the first guiding section which can be several meters long, a transportation sleeve having corresponding dimensions is slid over one of the bundle wires and guided up to the first distribution element. For example, eight fibers guided up to there are divided into four times two fibers. On two fibers, thinner transportation sleeves are then slid and guided over guiding grooves to the carrier shells. In the carrier shells further guiding of the fibers is performed without the sleeves.

This kind of splice cassette is difficult to handle, in particular when mounting at terminal distribution devices, due to the long guiding distances of the fibers and the necessity of sliding the transportation sleeves on. Preparation of the splicing process is expensive, inconvenient and difficult. Furthermore, no reserve lengths are available, in order to arrive at the splice workplace. The constructional height is always determined by the height of the carrier shells, irrespective of the number of carrier shells or also of the connection positions.

SUMMARY AND OBJECTS OF THE INVENTION

It is therefore the object of the present invention to develop a management-capable splice cassette that is exchangeable with other splice cassettes and that can in particular be inserted in prior art splice cassette housings instead of the conventional splice cassettes and secures an available reserve length and a small constructional height as well as an economical and simple handling.

According to the invention, a management-capable splice cassette for the telecommunication and data technique (telecommunication and data transmission applications) is provided for receiving carrier shells for two glass fibers (e.g. fiber optic elements formed of glass or similar material) each. The management-capable splice cassette includes a housing with cable connection means, for connecting cable, a carrier connected to the housing as well as carrier shells connected to the carrier in a rotatable manner. The carrier shells are disposed in at least two adjacent receiving portions and are stacked upon each other. Each of the carrier shells is rotatably supported into a latch position at one of their sides.

By arranging the carrier shells in two adjacent receiving portions such that the points of rotation of the individual carrier shells disposed on top of each other in different planes permit shorter guiding lengths of the glass fibers and in particular always secure in conjunction with splice cassette housings a sufficient reserve length for handling at a splice workplace, several splice cassettes (single-circuit management or carrier shells, resp.) for maximum two splices can be accommodated in a conventional splice cassette housing. This allows for a maximum twenty-four splices or an exchange for such a splice cassette, without using a tool. There is available also for such splice cassettes a corresponding working length of wires.

The constructional height is considerably lower than for conventionally stacking carrier shells. The constructional height is not determined by the height, but by the thickness of the carrier shells or by their number in the stack. Mounting or handling is simple and uncomplicated, since no sleeves are needed to approach the bundle wires to the carrier shells.

In the following, the invention will be described in more detail, based on an embodiment of a management-capable splice cassette disposed in a splice cassette housing and shown in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a side view in a sectional representation of the management-capable splice cassette of FIG. 2 with a folded-out carrier shell;

FIG. 4 is a top view of the housing of the management capable splice cassette of FIG. 2; and FIG. 5 is a top view of a carrier shell for two glass fibers according to FIG. 1.

DESCRIPTION OF THE PREFERRED EMBODIMENT

Figure 1:
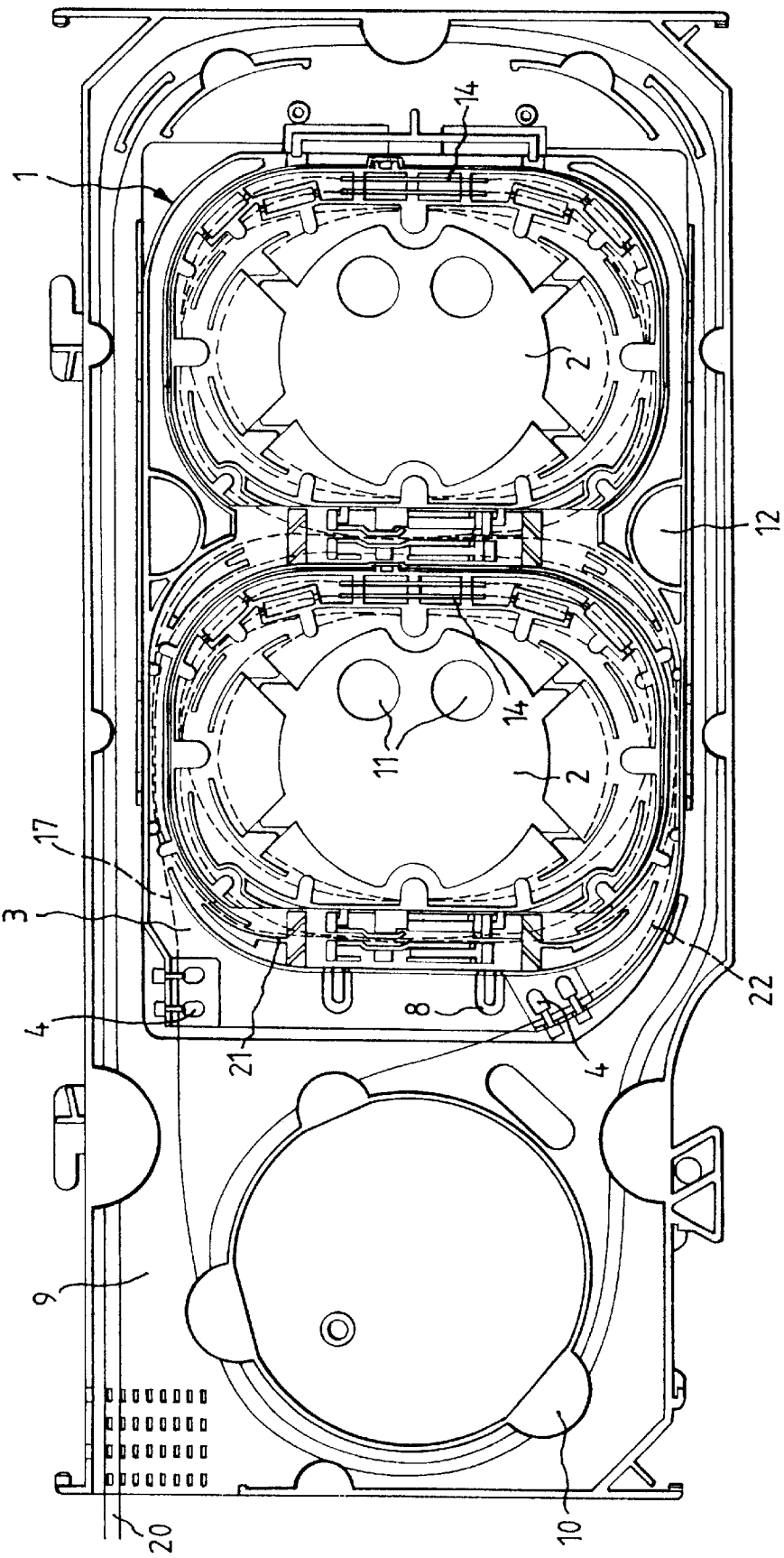
FIG. 1 is a top view of a splice cassette housing with inserted management-capable splice cassette and carrier shells included therein.

Referring to the drawings in particular, FIG. 1 shows in a top view a splice cassette main housing 9 with guiding portions 10 for reserve lengths, wherein a management-capable splice cassette 1 is inserted over latch devices 8.

Management-capable splice cassette 1 comprises cable connection means 4 and gripping depressions 12. Splice cassette 1 accommodates adjacent carrier shells 2 having the corresponding splices 14 for two glass fibers 17 each. Carrier shells 2 are provided with gripping openings 11, whereby a movement of carrier shells 2 over points of rotation 13 into a latch position 7 (FIG. 3) is made possible. In the present example, six carrier shells 2 for maximum twelve glass fibers 17 are included in splice cassette 1 (FIG. 3).

Figure 2:
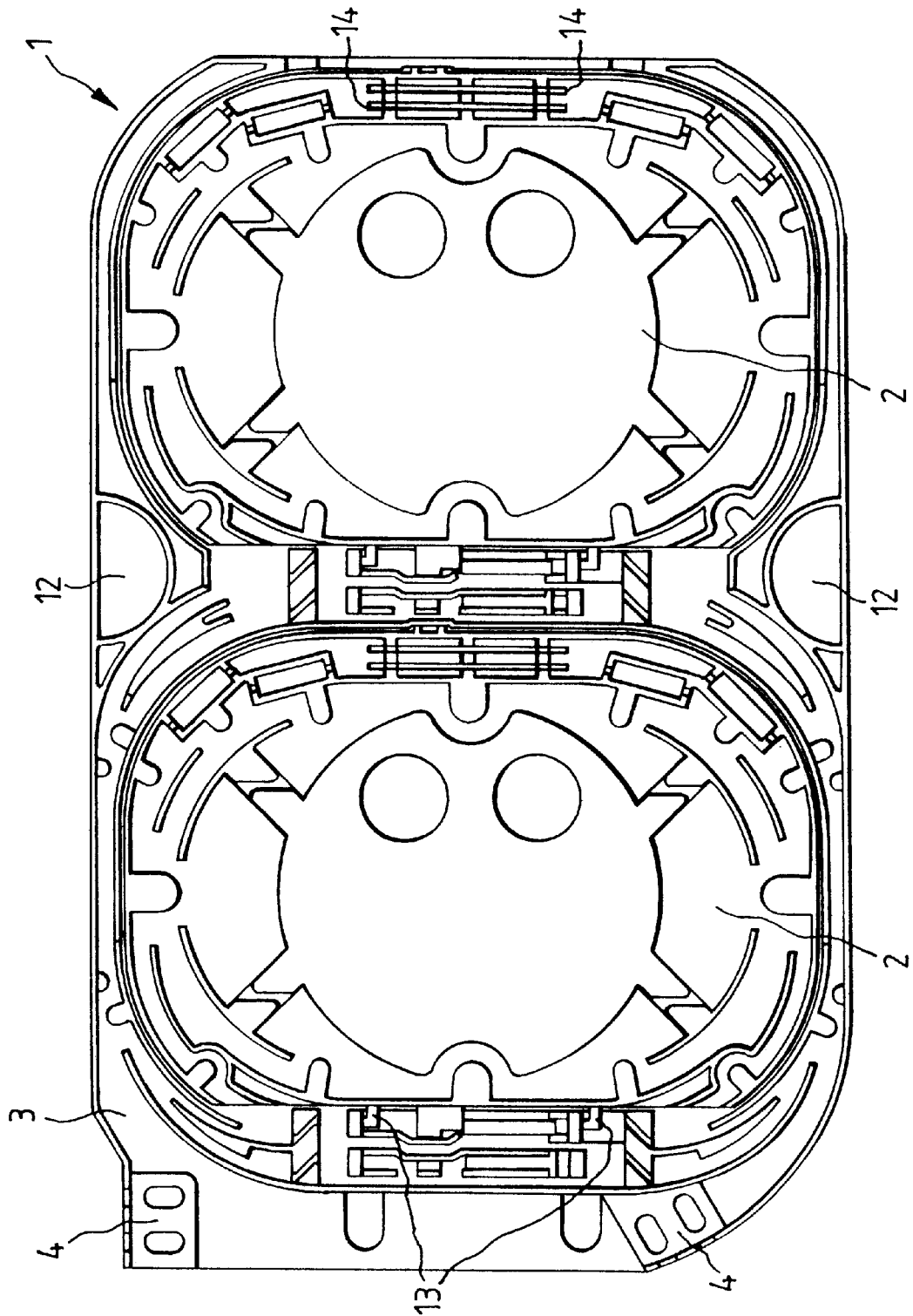
FIG. 2 is top view of the management-capable splice cassette of FIG. 1.

Splice cassette 1 of FIG. 2 comprises a carrier housing 3 where carrier shells 2 are inserted. FIG. 2 shows the arrangement of splices 14 and points of rotation (pivot points) 13 of inserted carrier shells 2 without glass fibers 17 inserted in the fiber guiding portions. Splice cassette 1 can in this embodiment also be used without splice cassette main housing 9 of FIG. 1 for example in 19 units. It is useful in some cases to provide cassette 1 with a not shown cover.

FIG. 3 shows in a sectional representation carrier shells 2 inserted in splice cassette 1, one of these carrier shells 2 being rotated into latch position 7, so that carrier shell 2 arranged underneath is freely accessible. Points or axis of rotation 13 of individual carrier shells 2 are disposed in different planes. As shown in FIG. 3, each rotational axis 13 is substantially parallel to a plane of a respective carrier shell 2.

FIG. 4 shows the top view of carrier housing 3 without inserted carrier shells 2. Housing 3 has receiving portions 6 for carrier shells 2 and two carrier support means 5 rotatably connected to carrier housing 3 by carrier shells 2. Further, cable connection means 4 and gripping depressions 12 are shown. Carriers 5 form together with elements 15 (FIG. 5) of the respective carrier shell 2 the respective point or axis of rotation 13 for carrier shell 2. A latch element 19 on carrier support means 5 permits latching-in of carrier shells 2.

FIG. 5 shows the top view of a carrier shell 2 with splices 14 and elements 15 for a rotatable support of carrier shell 2 on carrier 5 (FIG. 4). The carrier shell 2 comprises gripping openings 11 and holding-down devices 16. Latch element 18 acts together with latch element 19 (FIG. 4) on carrier support means 5 and secures latching-in of carrier shell 2 in a latch position 7 (FIG. 3). As shown in FIGS. 2, 3 and 5, each carrier support means 5 connects to a lateral edge of a respective carrier shell 2. The rotational axis 13 of the respective carrier shell 2 is substantially parallel to the lateral edge of the respective carrier shell 2.

According to the present invention, it is possible according to FIG. 1 to guide for example a bundle wire 20 with twelve glass fibers 17 in cut condition up to cable connection means 4, that is up to the entry of splice cassette 1. Only then the jacket of bundle wire 20 is removed, and the twelve glass fibers 17 are guided in guiding portions up to the entry of one of carrier shells 2, this entry being near to the point or axis of rotation 13 of carrier shell 2. Two glass fibers 17 are inserted into each of the six carrier shells 2 and connected over splices 14 to switching fibers 22. Switching fibers 22 are also guided up to cable connection means 4 at the exit of splice cassette 1 within splice cassette 1 without outside jacket and then with the conventional jacket in guiding portions.

While specific embodiments of the invention have been shown and described in detail to illustrate the application of the principles of the invention, it will be understood that the invention may be embodied otherwise without departing from such principles.

What is claimed is:

1. A management-capable splice cassette for the telecommunication and data transmission applications, comprising:

a carrier having, two adjacent receiving portions, latching means and support means; and carrier shells connectable to said carrier support means in a pivotable manner, each of said carrier shells being disposed in one of said two adjacent receiving portions and stacked upon each other, each of said carrier shells being supported for pivoting by said support means and movable into a latch position with said latch means at a carrier shell side, said support means defines points of pivoting of the individual carrier shells disposed in different planes.

2. The management-capable splice cassette according to claim 1, further comprising a splice cassette housing including reserve length guiding portions and housing latch means for snap-fitting said carrier into connection with said main housing.

3. The management-capable splice cassette according to claim 2, wherein a reserve length of the glass fibers is provided between a splice position of said carrier and said splice cassette housing.

4. The management-capable splice cassette according to claim 1, wherein said carrier has outside dimensions selected to be interchangeable with conventional splice cassettes.

5. The management-capable splice cassette according to claim 1, wherein said carrier shells have gripping openings.

6. The management-capable splice cassette according to claim 1, wherein said carrier includes gripping depressions.

7. The management-capable splice cassette according to claim 1, wherein a plurality of said carriers are stacked upon each other.

8. The management-capable splice cassette according to claim 1, further comprising a cover provided on said carrier.

9. The cassette in accordance with claim 1, wherein:

said carrier support means rotationally connects to a respective said carrier shell along a lateral edge of said respective carrier shell and about a rotational axis;

said each rotation axis is substantially parallel to said lateral edge of said respective carrier shell.

10. A management-capable splice cassette for the telecommunication and data transmission applications, comprising:

a carrier having, two adjacent receiving portions, latching means and support means;

a splice cassette housing with reserve length guiding portions and housing latch means for snap-fitting said carrier into connection with said splice cassette housing;

carrier shells connectable to said carrier support means in a pivotable manner, each of said carrier shells being disposed in one of said two adjacent receiving portions, wherein said carrier shells are stackable in each of said receiving portions, each of said carrier shells being supported for pivoting by said support means about a rotation axis and movable into a latch position with said latch means, said rotation axis being substantially parallel to a plane of a respective said carrier shell, said latch means being disposed at a side of a connected carrier shell.

11. The management-capable splice cassette according to claim 10, wherein said carrier has outside dimensions selected to be interchangeable with conventional splice cassettes.

12. The management-capable splice cassette according to claim 10, wherein said carrier shells have gripping openings.

13. The management-capable splice cassette according to claim 10, wherein said carrier includes gripping depressions.

14. The management-capable splice cassette according to claim 10, wherein a plurality of said carriers are stacked upon each other.

15. The management-capable splice cassette according to claim 10, further comprising a cover provided on said carrier.

16. The management-capable splice cassette according to claim 10, wherein a reserve length of the glass fibers is provided between a splice position of said carrier and said main housing.

17. The management-capable splice cassette according to claim 10, wherein said support means defines points of pivoting of the individual carrier shells disposed in different planes.

18. A splice cassette for fiber optic elements, the cassette comprising:

a carrier housing having two receiving portions and means for receiving the fiber optic elements;

a plurality of carrier shells receiving the fiber optic elements from said carrier housing, each of said plurality of carrier shells being associated with one of said receiving portions;

two carrier support means positioned on said carrier housing, each of said carrier support means being associated with one of said receiving portions, said each carrier support means rotationally connecting said carrier shells in said associated receiving portion to said carrier housing about a respective rotation axis for each said carrier shell, each said rotation axis being substantially parallel to a plane of a respective carrier shell, said each carrier support means stacking said respective carrier shells in said associated receiving portion.

19. The cassette in accordance with claim 18, wherein:

said carrier support means connects to said respective carrier shell along a lateral edge of said respective carrier shell;

said each rotation axis is substantially parallel to said lateral edge of said respective carrier shell.

20. The cassette in accordance with claim 19, further comprising:

latch means positioned on said carrier housing and for latching said carrier shells in a position pivoted away from said respective receiving portion.

* * * * *